United States Patent
Zhang

(10) Patent No.: US 12,050,377 B2
(45) Date of Patent: Jul. 30, 2024

(54) EDGE WRAPPING ADHESIVE TAPE AND DISPLAY DEVICE

(71) Applicant: WUHAN CHINA STAR OPTOELECTRONICS TECHNOLOGY CO., LTD., Hubei (CN)

(72) Inventor: Zhenzhen Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/594,040

(22) PCT Filed: Jul. 21, 2021

(86) PCT No.: PCT/CN2021/107652
§ 371 (c)(1),
(2) Date: Sep. 30, 2021

(87) PCT Pub. No.: WO2023/283978
PCT Pub. Date: Jan. 19, 2023

(65) Prior Publication Data
US 2024/0045247 A1    Feb. 8, 2024

(30) Foreign Application Priority Data

Jul. 12, 2021   (CN) .......................... 202110783424.X

(51) Int. Cl.
*G02F 1/1333*   (2006.01)
*G02F 1/1335*   (2006.01)

(52) U.S. Cl.
CPC .. *G02F 1/133317* (2021.01); *G02F 1/133528* (2013.01); *G02F 2202/28* (2013.01)

(58) Field of Classification Search
CPC ........... G02F 2202/28; G02F 1/133528; G02F 1/133317
See application file for complete search history.

(56) References Cited

U.S. PATENT DOCUMENTS

2016/0274390 A1*  9/2016  Chen ................... G02F 1/1339
2019/0243181 A1*  8/2019  Hirata ................. G02F 1/13338
(Continued)

FOREIGN PATENT DOCUMENTS

CN           203646849 U        6/2014
CN           206033665 U        3/2017
(Continued)

*Primary Examiner* — Mariam Qureshi

(57) ABSTRACT

An edge wrapping adhesive tape is provided. The edge wrapping adhesive tape is provided with a plurality of first notches and a plurality of second notches opposite to each other. Both the plurality of first notches and the plurality of second notches are corresponding to corners of a display device. After the edge wrapping adhesive tape is wrapped on the display device, no light leakage gaps are left on a side and a first surface of the display device. There is no overlap and stacking of edge wrapping adhesive tape on the side and a second surface of the display device, which alleviate a problem of poor performance of the edge wrapping adhesive tape of an existing liquid crystal display device. The display device is also provided.

17 Claims, 11 Drawing Sheets

(56) References Cited

U.S. PATENT DOCUMENTS

2021/0318572 A1* 10/2021 Wang ................ G02F 1/133528
2022/0252917 A1* 8/2022 Zou ................... G02F 1/133325

FOREIGN PATENT DOCUMENTS

| CN | 206497892 U | 9/2017 |
| CN | 208448179 U | 2/2019 |
| CN | 110908187 A | 3/2020 |
| CN | 210237517 U | 4/2020 |
| CN | 210765103 U | 6/2020 |

* cited by examiner

EDGE WRAPPING ADHESIVE TAPE AND DISPLAY DEVICE

TECHNICAL FIELD

The present disclosure relates to a field of display technology, and more particularly to an edge wrapping adhesive tape and a display device.

BACKGROUND

For a traditional liquid crystal display module, generally after a liquid crystal display (LCD) liquid crystal screen and a backlight module are laminated, an edge wrapping adhesive tape is used to wrap along an edge of a product to prevent light leakage on a side of the product, and at the same time to strengthen a combination of the LCD liquid crystal screen and the backlight module. However, due to an existence of objective factors such as a manufacturing dimensional tolerance and an actual attachment tolerance of the edge wrapping adhesive tape, a corner position of the LCD module cannot be completely wrapped. This will cause light to leak out from a leaking plastic frame and a gap between the LCD screen and the backlight module. The edge wrapping adhesive tape at a corner of the LCD module can be overlapped to reduce the light leakage. However, when the edge wrapping adhesive tape overlaps too much, the edge wrapping adhesive tape will stack irregularly around the corner of the module, and a stacked edge wrapping adhesive tape will easily interfere with a corner of the whole machine and affect an assembly effect.

Therefore, a conventional edge wrapping adhesive tape of the liquid crystal display module has a technical problem of poor performance that needs to be solved.

SUMMARY

The present disclosure provides an edge wrapping adhesive tape and a display device, which can alleviate a technical problem of poor performance of the edge wrapping adhesive tape of the conventional liquid crystal display module.

In order to solve the above technical problem, technical solutions provided by the present disclosure are as follows:

Embodiments of the present disclosure provide an edge wrapping adhesive tape, including a first tape part, a second tape part, and a third tape part which are integrally disposed; wherein
  the first tape part defines a plurality of first notches at intervals;
  a plurality of second notches are defined at intervals on a side of the third tape part away from the first tape part, and each of the second notches is arranged opposite to a corresponding first notch; and
  the second tape part is disposed between the first tape part and the third tape part.

In the edge wrapping adhesive tape provided in the embodiments of the present disclosure, a depth of each of the first notches is equal to a width of the first tape part, and a depth of each of the second notches is equal to a width of the third tape part.

In the edge wrapping adhesive tape provided in the embodiments of the present disclosure, a centerline of each of the first notches is collinear with a centerline of a corresponding second notch.

In the edge wrapping adhesive tape provided in the embodiments of the present disclosure, in a direction along a long side of the edge wrapping adhesive tape, a length of each of the second notches is greater than a length of a corresponding first notch.

In the edge wrapping adhesive tape provided in the embodiments of the present disclosure, a shape of a longitudinal section of each of the first notches is rectangular.

In the edge wrapping adhesive tape provided in the embodiments of the present disclosure, each of the first notches includes a first sub-notch, the first sub-notch includes a first side and a second side, an included angle is formed between the first side and the second side, and the included angle is close to a corresponding second notch.

In the edge wrapping adhesive tape provided in the embodiments of the present disclosure, the included angle is defined at the first tape part, and the included angle ranges from 90 degrees to 120 degrees.

In the edge wrapping adhesive tape provided in the embodiments of the present disclosure, the included angle is defined at the second tape part, and the included angle is formed by an intersection of extension lines of the first side and the second side.

In the edge wrapping adhesive tape provided in the embodiments of the present disclosure, each of the first notches further includes a second sub-notch, and the second sub-notch and the first sub-notch are symmetrical about the a centerline of a corresponding first notch.

In the edge wrapping adhesive tape provided in the embodiments of the present disclosure, the first sub-notch and the second sub-notch are intersected, and an intersection of the first sub-notch and the second sub-notch is far away from a corresponding second notch.

In the edge wrapping adhesive tape provided in the embodiments of the present disclosure, the first sub-notch and the second sub-notch are arranged at intervals.

The embodiments of the present disclosure provide a display device, including:
  a display panel;
  a backlight module disposed opposite to the display panel; and
  a first edge wrapping adhesive tape wrapped on a plurality of sides of the display device, wherein the first edge wrapping adhesive tape is formed after being wrapped on the display device by the edge wrapping adhesive tape of above-mentioned embodiments.

In the display device provided in the embodiments of the present disclosure, a first tape part of an edge wrapping adhesive tape is wrapped on a first surface of the display device, a second tape part is wrapped on a side surface of the display device, and a third tape part is wrapped on a second surface of the display device.

In the display device provided in the embodiments of the present disclosure, an upper polarizer is attached to a side of the display panel away from the backlight module, an outer contour of the upper polarizer is smaller than an outer contour of the display device, and the first tape part is attached to an area on the display panel where the upper polarizer is not provided.

In the display device provided in the embodiments of the present disclosure, the display device comprises a plurality of corners, and first notches and second notches of the edge wrapping adhesive tape are corresponding to the plurality of corners of the display device.

In the display device provided in the embodiments of the present disclosure, a centerline of each of the first notches is collinear with a center axis of a corresponding corner.

In the display device provided in the embodiments of the present disclosure, each of the first notches includes a first sub-notch, the first sub-notch includes a first side and a second side, an included angle is formed between the first side and the second side, and the included angle is close to a corresponding second notch.

In the display device provided in the embodiments of the present disclosure, each of the first notches further includes a second sub-notch, and the second sub-notch and the first sub-notch are symmetrical about the a centerline of a corresponding first notch.

In the display device provided in the embodiments of the present disclosure, the first sub-notch and the second sub-notch are intersected, and an intersection of the first sub-notch and the second sub-notch is far away from a corresponding second notch.

In the display device provided in the embodiments of the present disclosure, the first sub-notch and the second sub-notch are disposed at intervals.

In the edge wrapping adhesive tape and the display device provided in the present disclosure, the edge wrapping adhesive tape includes a first tape part, a second tape part and a third tape part that are integrally disposed, the first tape part defines a plurality of first notches at intervals, the third tape part defines a plurality of second notches opposite to the first notches, and both the first notches and the second notches are corresponding to corners of the display device. In this way, after the edge wrapping adhesive tape is wrapped in the display device, no light leakage gap are left on a side and a first surface of the display device, which solves the problem of light leakage in the corners of the module. Moreover, there is no overlap and stacking of edge wrapping adhesive tape on the side and a second surface of the display device, which avoids interference with the corners of the whole machine. This makes the appearance size more stable, and solves a technical problem of poor performance of a traditional edge wrapping adhesive tape of a liquid crystal display module. At the same time, an integrated design of the edge wrapping adhesive tape reduces the cost of cutting and manual attachment.

DESCRIPTION OF DRAWINGS

In order to explain the embodiments of the present disclosure more clearly, the following briefly introduces the drawings that need to be used in the embodiments. The drawings in the following description are only part of the embodiments of the present disclosure. For those of ordinary skill in the art, other drawings can be obtained based on these drawings without creative work.

DETAILED DESCRIPTION OF PREFERRED EMBODIMENTS

Figure 1A:
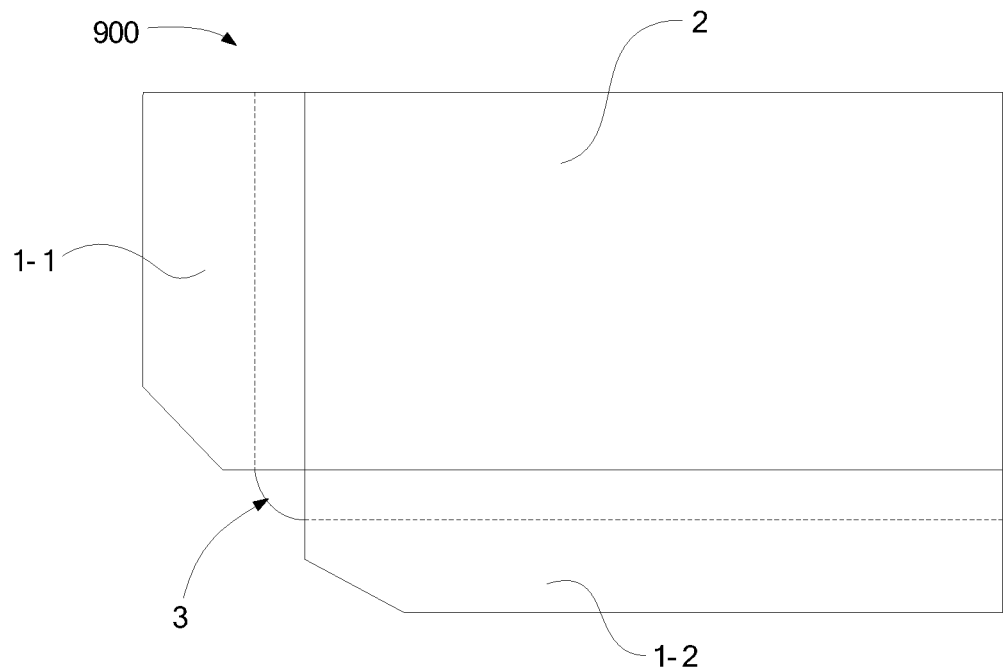
FIGS. 1a to 1c are schematic diagrams of a method of attaching an edge wrapping adhesive tape of a traditional liquid crystal display module.

The description of following embodiments refers to the attached drawings to illustrate specific embodiments that the present disclosure can be implemented. Directional terms mentioned in this disclosure, such as "top", "bottom", "front", "rear", "left", "right", "inside", "outside", "side", etc., are only directions for referring to the attached drawings. Therefore, the directional terms used are used to illustrate and understand the present disclosure, rather than to limit the present disclosure. In the figure, units with similar structures are indicated by same reference numerals. In the drawings, for clear understanding and ease of description, the thickness of some layers and regions are exaggerated. Namely, the size and thickness of each component shown in the drawings are arbitrarily shown, but the present disclosure is not limited to this.

In view of a technical problem of poor performance of a traditional edge wrapping adhesive tape of a liquid crystal display module, an inventor found that a main reason is that the edge wrapping adhesive tape adopts a segmented design. In order to reduce light leakage at corners of the liquid crystal display module, a segmented edge wrapping adhesive tape will overlap at the corners of the liquid crystal display module, and the light leakage at the corners cannot be completely avoided.

Figure 1B:
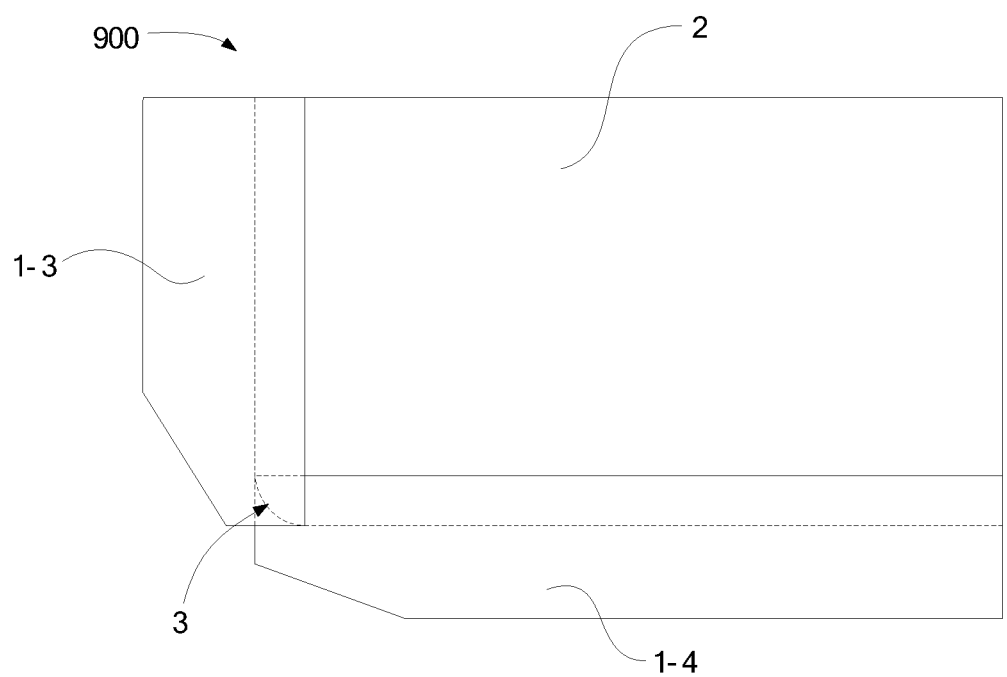
Figure 1C:
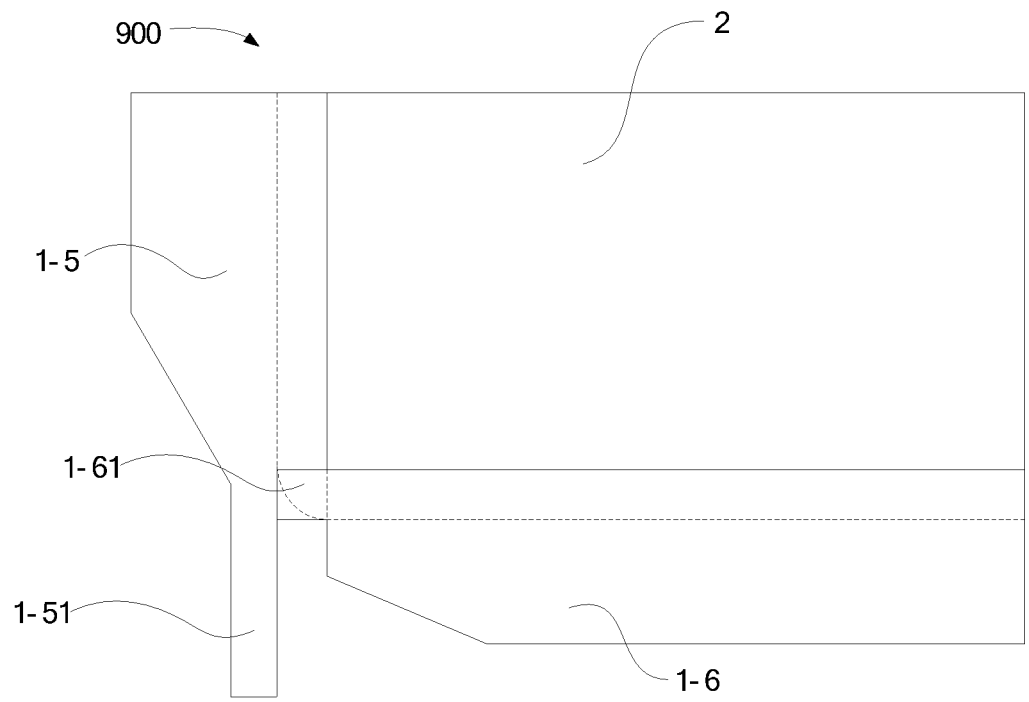

Specifically, please refer to FIG. 1a, FIG. 1B, and FIG. 1c. FIGS. 1a to 1c are schematic diagrams of a method of attaching the edge wrapping adhesive tape of a traditional LCD module. As shown in FIG. 1a, two adjacent sections of the edge wrapping adhesive tapes 1-1 and 1-2 cut a polarizer 2 and are attached, so no adhesive tape blocks the corners 3 of the LCD module 900, so that light leaks at the corners 3 of the LCD module 900. In order to reduce the light leakage at the corners of the module, an attachment method as shown in FIG. 1B appears. Adjacent two pieces of the edge wrapping adhesive tape 1-3 and 1-4 are attached to a shape of the LCD module 900. In this way, the corners 3 of the LCD module 900 can be blocked and the light leakage at the corners can be reduced. However, when the corners of the LCD module 900 are rounded, there will be an excessive overlap of the edge wrapping adhesive tape at the corner 3, which affects an overall size of the liquid crystal display module 900. In order to improve corner light leakage and tape stacking, an attachment method as shown in FIG. 1c appeared. Adjacent two pieces of the edge wrapping adhesive tape 1-5 and 1-6 are attached to the shape of the LCD module 900, and two adjacent sections of the edge wrapping adhesive tape 1-5 and 1-6 are provided with protruding thin adhesive tape 1-51 and 1-61, respectively. The thin adhesive tape 1-51 is configured to wrap a side of the module. Although this design can improve corner light leakage and tape stacking to a certain extent, however, a width of the thin adhesive tape 1-51 is smaller than a thickness of the module, usually about 1 mm. In fact, when attaching side corners, because the thin adhesive tape 1-51 is narrow and short, it is easy to skewed up and down. Therefore, demand for attaching accuracy is higher, and there is still a certain tape stack on the side of the module.

Figure 2:
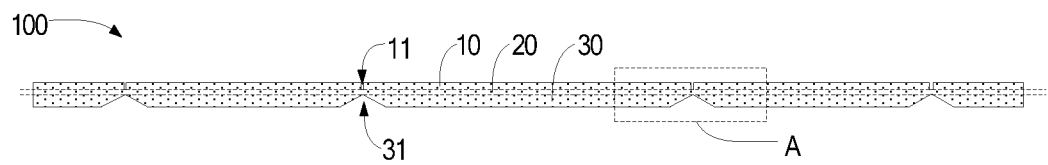
FIG. 2 is a schematic diagram of an unfolded structure of an edge wrapping adhesive tape provided by an embodiment of the present disclosure.
Figure 3:
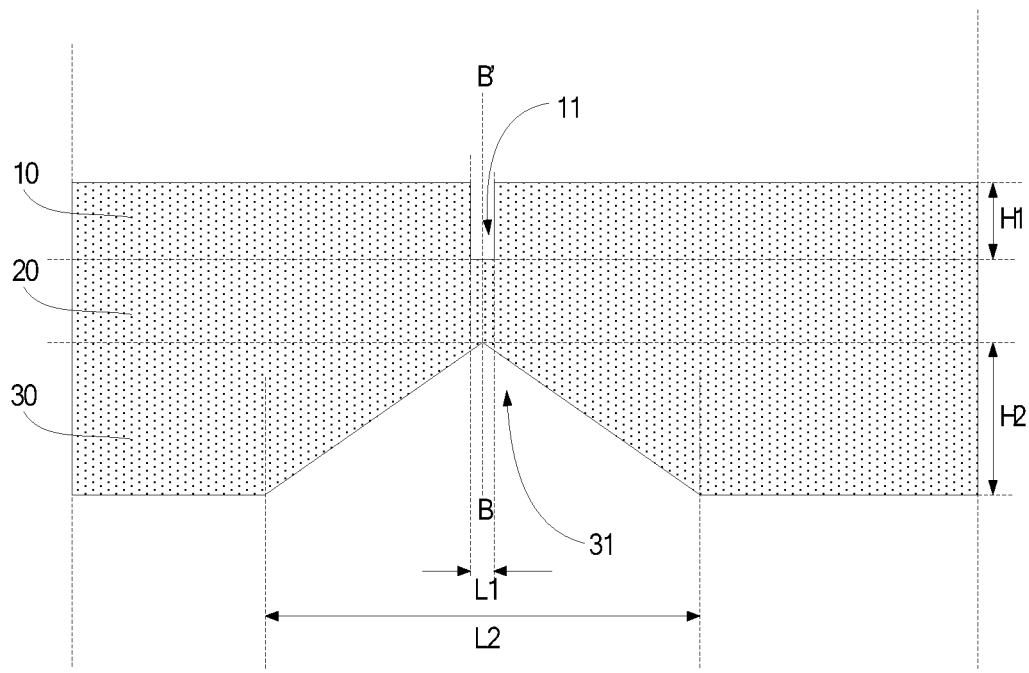
FIG. 3 is an enlarged schematic view of A in FIG. 2.
Figure 4:
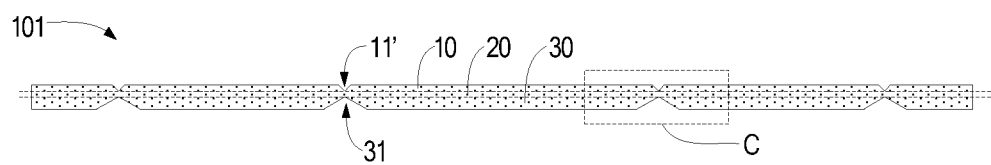
FIG. 4 is a schematic diagram of another unfolded structure of the edge wrapping adhesive tape provided by an embodiment of the present disclosure.
Figure 5:
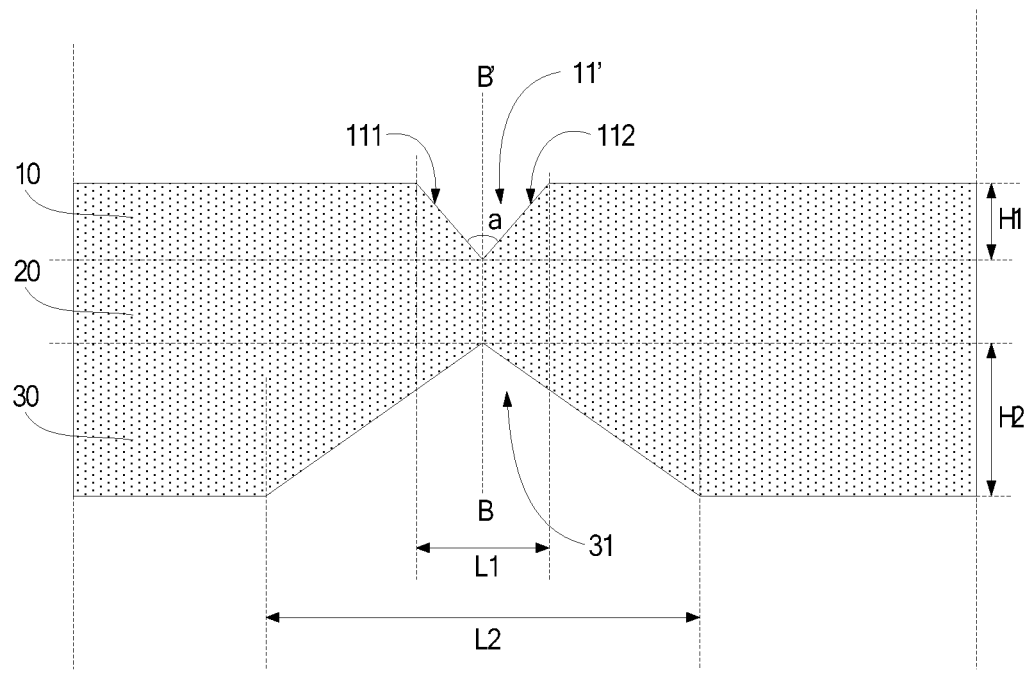
FIG. 5 is an enlarged schematic diagram of C in FIG. 4.
Figure 6:
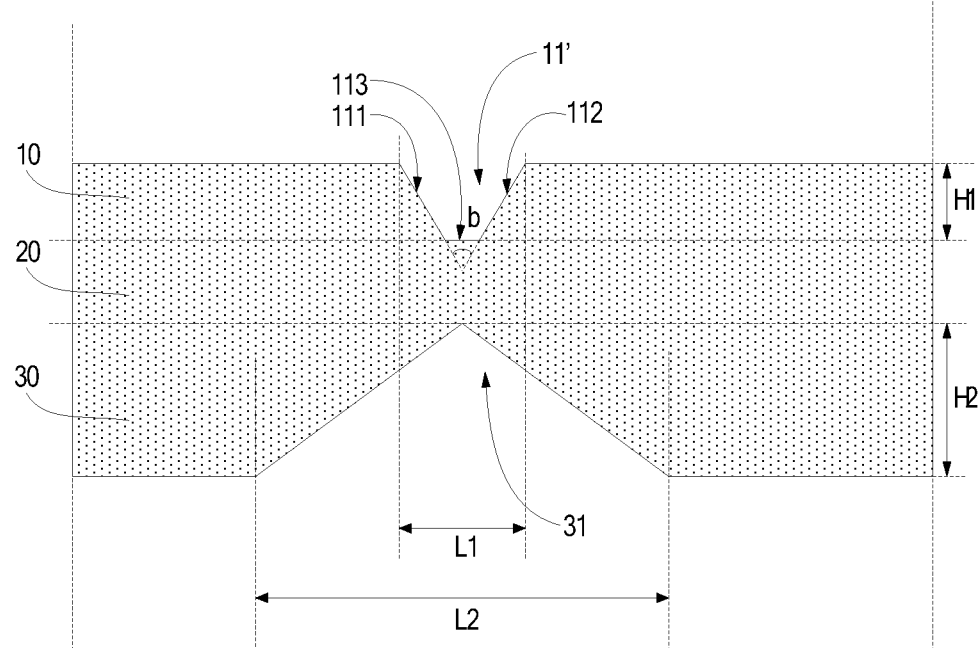
FIG. 6 is a schematic diagram of another structure of a first notch in FIG.
Figure 7:
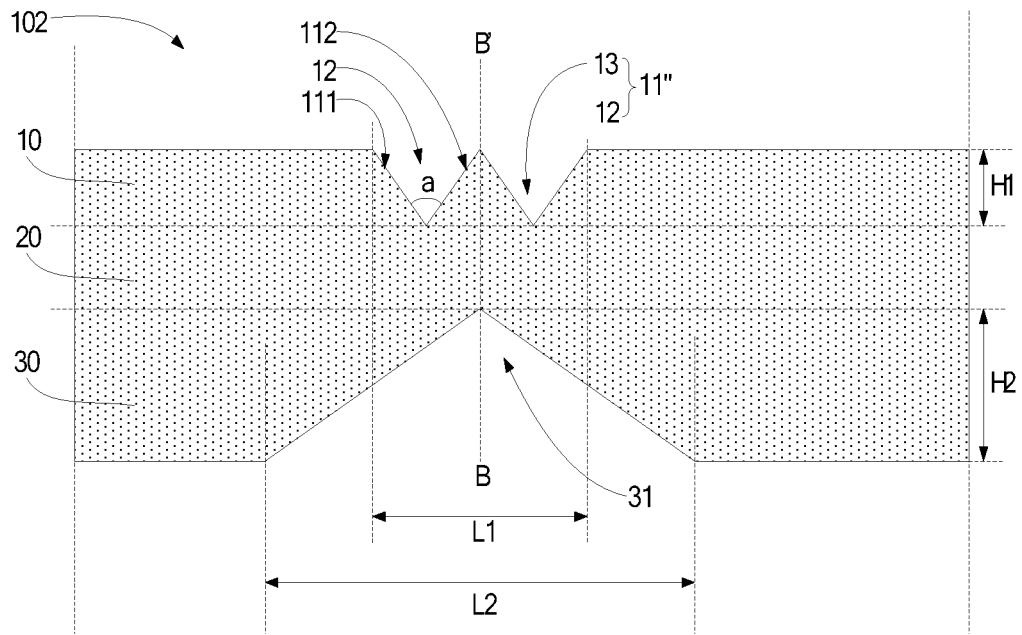
FIG. 7 is a schematic diagram of another unfolded structure of the edge wrapping adhesive tape provided by an embodiment of the present disclosure.
Figure 8:
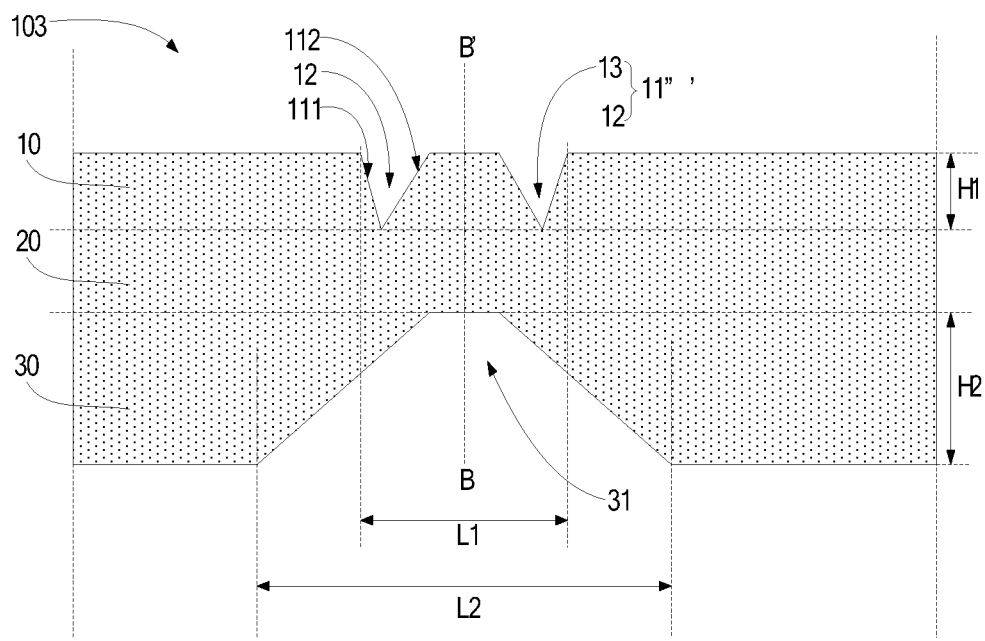
FIG. 8 is a schematic diagram of yet another unfolded structure of the edge wrapping adhesive tape provided by an embodiment of the present disclosure.

For this reason, an embodiment of the present disclosure provides an integrated edge wrapping adhesive tape and a display device to solve above-mentioned problems. FIG. 2 is a schematic diagram of an unfolded structure of an edge wrapping adhesive tape provided by an embodiment of the present disclosure. FIG. 3 is an enlarged schematic view of A in FIG. 2. FIG. 4 is a schematic diagram of another unfolded structure of the edge wrapping adhesive tape provided by an embodiment of the present disclosure. FIG. 5 is an enlarged schematic diagram of C in FIG. 4. FIG. 6 is a schematic diagram of another structure of a first notch in FIG. 5. FIG. 7 is a schematic diagram of another unfolded structure of the edge wrapping adhesive tape provided by an embodiment of the present disclosure. FIG. 8 is a schematic diagram of yet another unfolded structure of the edge wrapping adhesive tape provided by an embodiment of the present disclosure. Each of the edge wrapping adhesive tapes as shown in FIGS. 2 to 8 includes a first tape part 10, a second tape part 20, and a third tape part 30 which are integrally arranged. Wherein the first tape part 10, the second tape part 20, and the third tape part 30 are disposed in sequence along a short side direction of the edge wrapping adhesive tape. A short side of the edge wrapping adhesive tape refers to a side of the edge wrapping adhesive tape with a shorter side length, correspondingly, a side of the edge wrapping adhesive tape with a longer side length is a long side of the edge wrapping adhesive tape.

Specifically, taking the edge wrapping adhesive tape 100 shown in FIG. 2 and FIG. 3 as an example, the first tape part 10 defines a plurality of first notches 11 at intervals, and a shape of a longitudinal section of the first notches 11 is rectangular. The second notches 31 is defined at intervals on a side of the third tape part 30 away from the first tape part 10, and the second notches 31 is disposed opposite to the first notches 11. The second tape part 20 is disposed between the first tape part 10 and the third tape part 30. A depth H1 of each of the first notches 11 is equal to a width of the first tape part 10, and a depth H2 of each of the second notches 31 is equal to a width of the third tape part 30. A centerline B-B' of each of the first notches 11 is collinear with a centerline B-B' of a corresponding second notch 31. And in a direction along the long side of the edge wrapping adhesive tape 100, a length of each of the second notches 31 is greater than a length of a corresponding first notch 11.

Optionally, please refer to the edge wrapping adhesive tape 101 shown in FIG. 4 and FIG. 5. Each of the first notches 11' includes a first sub-notch, the first sub-notch includes a first side 111 and a second side 112, an included angle a is formed between the first side 111 and the second side 112, and the included angle a is close to a corresponding second notch 31. The included angle a is defined at the first tape part 10, and the included angle a ranges from 90 degrees to 120 degrees.

Optionally, referring to FIG. 6, an included angle b is formed between the first side 111 and the second side 112, the included angle b is defined at the second tape part 20, and the included angle b is formed by an intersection of extension lines of the first side 111 and the second side 112.

Optionally, please refer to the edge wrapping adhesive tape 102 shown in FIG. 7. Each of the first notches 11" further includes a second sub-notch 13, and the second sub-notch 13 and the first sub-notch 12 are symmetrical about a centerline B-B' of a corresponding first notch 11". And the first sub-notch 12 and the second sub-notch 13 are intersected, and an intersection of the first sub-notch 12 and the second sub-notch 13 is far away from the corresponding second notch 31.

Optionally, please refer to the edge wrapping adhesive tape 103 shown in FIG. 8. The first notch 11''' includes the first sub-notch 12 and the second sub-notch 13. The first sub-notch 12 and the second sub-notch 13 are arranged at intervals.

Figure 9:
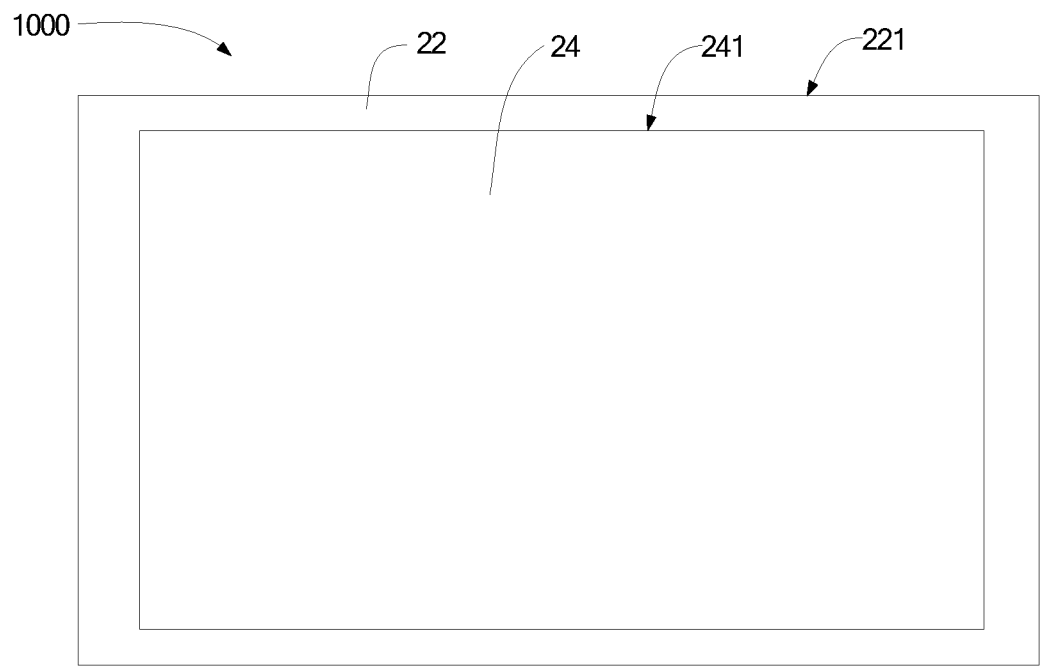
FIG. 9 is a schematic top view of a structure of a display device provided by an embodiment of the present disclosure.
Figure 10:
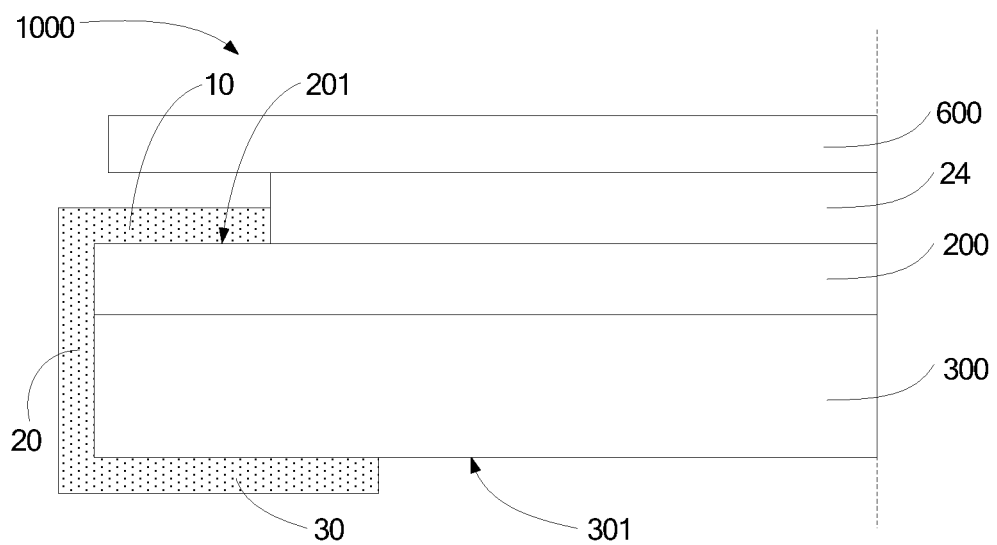
FIG. 10 is a schematic diagram of a cross-sectional structure of the display device provided by an embodiment of the present disclosure.
Figure 11:
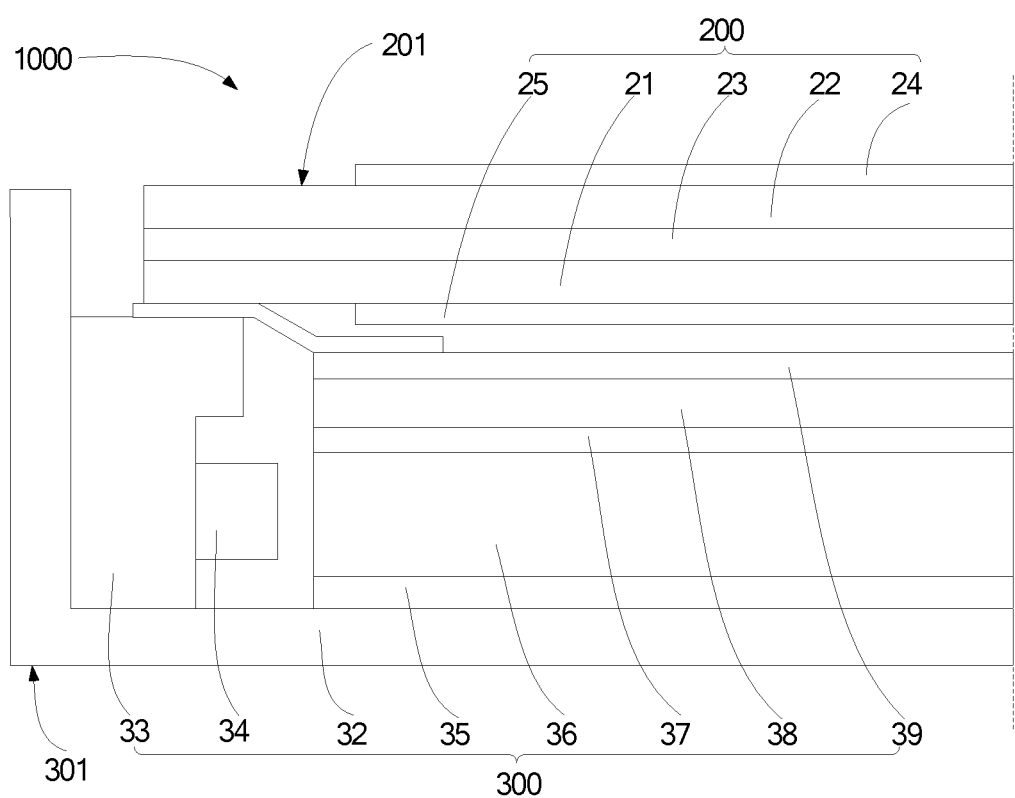
FIG. 11 is a detailed schematic diagram of the display device provided by an embodiment of the present disclosure.

The present disclosure also provides a display device, and the edge wrapping adhesive tape of the present disclosure can wrap a side of the display device, and a structure of the edge wrapping adhesive tape will be specifically described below in conjunction with the display device of the present disclosure:

Please refer to FIGS. 2 to 3 and FIGS. 9 to 11 in combination, FIG. 9 is a schematic top view of a structure of a display device provided by an embodiment of the present disclosure, FIG. 10 is a schematic diagram of a cross-sectional structure of the display device provided by an embodiment of the present disclosure, and FIG. 11 is a detailed schematic diagram of the display device provided by an embodiment of the present disclosure. The display device 1000 includes a display panel 200, a backlight module 300 attached to the display panel 200, and a cover 600 attached to a side of the display panel 200 away from the backlight module 300. The backlight module 300 provides backlight for the display panel 200. The cover 600 is configured to protect the display panel 200. The display panel 200 includes an array substrate 21 and a color filter substrate 22 disposed oppositely to the array substrate, a liquid crystal layer 23 disposed between the array substrate 21 and the color filter substrate 22, an upper polarizer 24 attached to a side of the color filter substrate 22 away from the array substrate 21, and a lower polarizer 25 attached to a side of the array substrate 21 away from the color filter substrate 22. An outer contour 241 of the upper polarizer 24 is smaller than an outer contour 221 of the display device 1000.

The backlight module 300 is disposed on a side of an array substrate 21 away from the color filter substrate 22 and has a gap between the lower polarizer 25. Optionally, the backlight module 300 includes a backplane 32, a plastic frame 33, a backlight source 34, a reflective sheet 35, a light guide plate 36, a lower diffusion sheet 37, a brightness enhancement sheet 38, an upper diffusion sheet 39, and so on. The backplane 32 is formed with an accommodating cavity, and optical films such as the plastic frame 33, the backlight source 34, and the reflective sheet 35 are all disposed in the accommodating cavity.

Optionally, the plastic frame 33 may be fixed around the accommodating cavity by a fixing method such as adhesive tape to support the display panel 200. Of course, the plastic frame 33 can also be integrated with the backplane 32 to form a plastic-iron integrated backplane 32. The reflective sheet 35 is arranged at a bottom of the accommodating cavity, and the light guide plate 36 is arranged on a side of the reflective sheet 35 away from the bottom of the accommodating cavity. The backlight source 34 is disposed between the light guide plate 36 and the plastic frame 33, and the backlight source 34 is fixed on the plastic frame 33, and the reflective sheet 35 is configured to reflect light emitted from a lower surface of the light guide plate 36 back into the light guide plate 36 to improve a light utilization rate of the backlight source 34. The lower surface of the light guide plate 36 refers to a side of the light guide plate 36 facing the reflective sheet 35.

The lower diffusion sheet 37 is arranged on a side of the light guide plate 36 away from the reflective sheet 35. The brightness enhancement sheet 38 is arranged on a side of the lower diffusion sheet 37 away from the light guide plate 36, The upper diffusion sheet 39 is disposed on a side of the brightness enhancement sheet 38 away from the lower diffusion sheet 37. It should be noted that a structure of the backlight module 300 of the present disclosure is not limited to an edge-lit backlight structure illustrated in the embodiments of the present disclosure. The backlight module 300 of the present disclosure can also adopt a direct backlight structure. Moreover, the optical films of the backlight module 300 is not limited to what is illustrated in the embodiments of the present disclosure, and the optical films of the backlight module 300 of the present disclosure can be specifically configured according to actual needs.

After a combination of the backlight module 300 and the display panel 200, a gap at a junction of the backlight module 300 and the display panel 200 and an exposed rubber frame 33 will cause light leakage of the display device 1000. The edge wrapping adhesive tape 100 of the present disclosure is wrapped on a side of the display device 1000 to avoid the light leakage of the display device 1000 and can enhance the combination of the backlight module 300 and the display panel 200. Optionally, a material of the edge wrapping adhesive tape 100 includes copper foil, aluminum foil, conductive cloth, single-sided adhesive, and so on.

The first tape part 10 of the edge wrapping adhesive tape 100 is provided with the first notches 11 arranged at intervals, and the first tape part 10 is configured to wrap an edge of the first surface 201 of the display device 1000. The edge of the first surface 201 of the display device 1000 refers to an area on the side of the display panel 200 away from the backlight module 300 that is not covered by the upper polarizer 24, namely, an area on the side of the color filter substrate 22 away from the array substrate 21 that is not covered by the upper polarizer 24.

The third tape part 30 is provided with the second notches 31 arranged at intervals. A second notch 31 is disposed opposite to a corresponding first notch 11. The third tape part 30 is configured to wrap an edge of the second surface 301 of the display device 1000. The edge of the second surface 301 of the display device 1000 refers to an edge area on a side of the backlight module 300 away from the display panel 200.

The second tape part 20 is disposed between the first tape part 10 and the third tape part 30, and is configured to wrap a side surface of the display device 1000. The side surface of the display device 1000 refers to a surface formed between the first surface 201 and the second surface 301 of the display device 1000.

Wherein, the first notch 11 and the second notch 31 are corresponding to corners of the display device 1000. The first notch 11 and the second notch 31 are configured to make the side surface of the display device 1000 and the second surface 301 of the display device 1000 not overlap with the edge wrapping adhesive tape 100 after the edge wrapping adhesive tape 100 wraps the display device 1000, and are configured to make the edge of the first surface 201 of the display device 1000 have no light leakage gap. The corner of the display device 1000 refers to an included angle formed between two adjacent sides of the display device 1000. When two adjacent sides of the display device 1000 directly intersect, the corner of the display device 1000 is a right angle. When a transitional arc surface is provided between two adjacent side surfaces of the display device 1000, the corners of the display device 1000 are rounded corners. When a transitional short plane is provided between two adjacent sides of the display device 1000, the corner of the display device 1000 is a chamfered corner. Of course, the corners of the display device 1000 of the present disclosure are not limited to this.

In the following, taking the corners of the display device 1000 as right angles as an example, specific structures of the first notch 11 and the second notch 31 will be described in detail.

Specifically, the first notch 11 is a broken tangent line, and the second notch 31 is a V-shaped notch. The broken tangent line is a cutting track left after cutting the first tape part 10, and a shape of a longitudinal cross-section of the cutting track is rectangular. Alternatively, the first notch can also be set as a pre-break line, and the pre-break line is formed by a plurality of small holes at intervals. When it is necessary to attach the first tape part 10 to the edge of the first surface 201 of the display device 1000, the pre-break line is broken, and a plurality of spaced small holes penetrate through. The V-shaped notch of the second notch 31 refers to a cross-sectional shape formed by an intersection of two sides of the second notch 31.

The depth H1 of each of the first notches 11 is equal to the width of the first tape part 10, and the depth H2 of each of the second notch 31 is equal to the width of the third tape part 30. Optionally, the width of the first tape part 10 is equal to a distance between the outer contour 241 of the upper polarizer 24 and the outer contour 221 of the display device 1000. Of course, the width of the first tape part 10 can also be slightly smaller than the distance between the outer contour 241 of the upper polarizer 24 and the outer contour 221 of the display device 1000, as long as the width is sufficient to block light leakage from the edge of the first surface 201 of the display device 1000. The depth H1 of each of the first notches 11 and the depth H2 of each of the second notch 31 both refer to a length extending in a direction parallel to the short side of the edge wrapping adhesive tape 100. The widths of the first tape part 10 and the third tape part 30 both refer to the length extending in a direction parallel to the short side of the edge wrapping adhesive tape 100. The short side of the edge wrapping adhesive tape 100 refers to the side with a shorter side length. The long side of the edge wrapping adhesive tape 100 refers to the side longer than the short side.

A centerline B-B' of the first notch 11 is collinear with a centerline B-B' of the second notch 31, and the centerline B-B' of the first notch 11 is also collinear with a center axis of the corner of the display device 1000, to ensure that when the edge wrapping adhesive tape 100 wraps the display device 1000, a corner area of the edge wrapping adhesive tape 100 is arranged between the first notch 11 and the second notch 31, and to ensure that the corner area of the edge wrapping adhesive tape 100 matches a corner area of the display device 1000.

It should be noted that the centerline B-B' of the first notch 11 and the centerline B-B' of the second notch 31 both refer to straight lines that bisect the first notch 11 and the second notch 31, namely, the first notch 11 and the second notch 31 are divided into two symmetrical parts by respective centerlines B-B'. The central axis of the corner of the display device 1000 refers to a central axis of an area where two adjacent side surfaces of the display device 1000 intersect. For example, when the corner of the display device 1000 is a right angle, the center axis of the corner of the display device 1000 is a straight line formed by a direct intersection of two adjacent side surfaces of the display device 1000.

Further, a length L2 of each of the second notches 31 is greater than a length L1 of each of the first notches 11, and the length L1 of the each of the first notches 11 and the length L2 of each of the second notches 31 refer to the longest length extending in a direction parallel to the long side of the edge wrapping adhesive tape 100.

Figure 12:
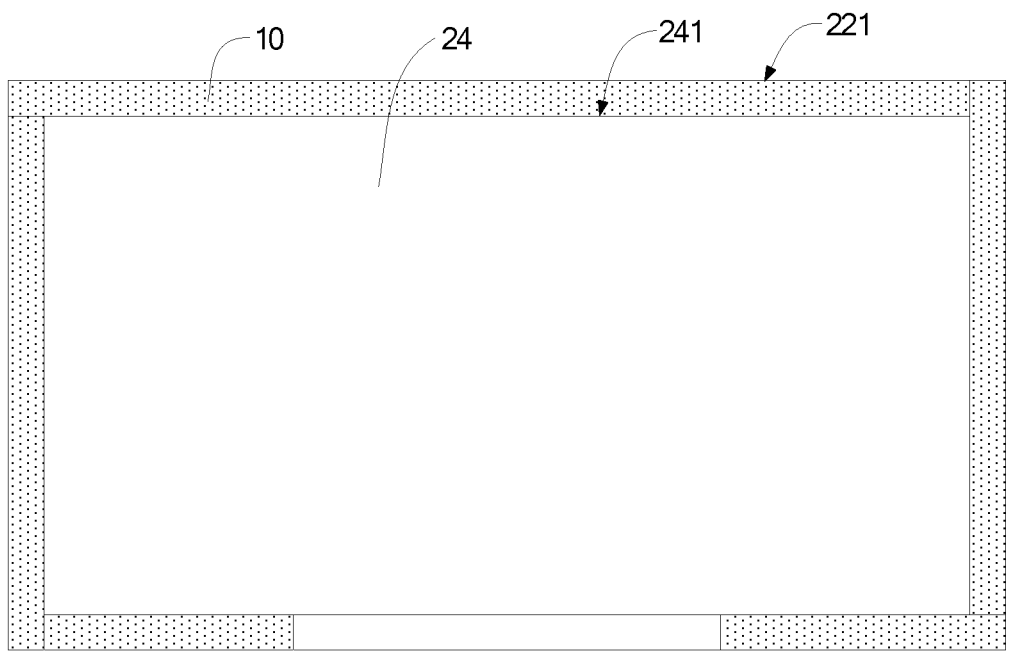
FIG. 12 is a schematic diagram of a top view structure of the edge wrapping adhesive tape attached to a first surface of the display device provided by an embodiment of the present disclosure.
Figure 13:
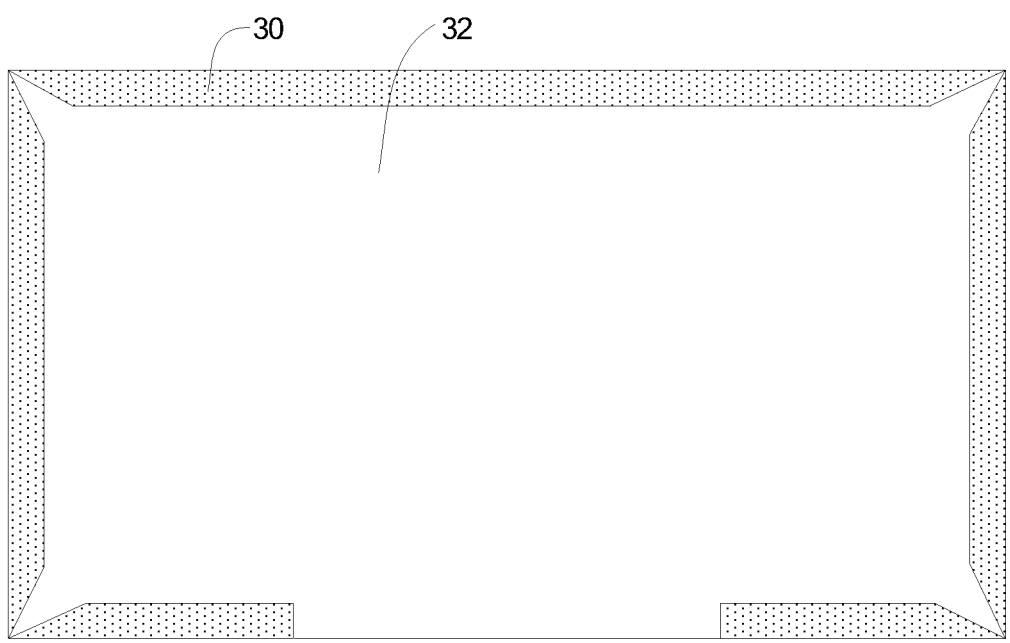
FIG. 13 is a schematic top view of a structure of the edge wrapping adhesive tape attached to a second surface of the display device provided by an embodiment of the present disclosure.

Specifically, please refer to FIGS. 2 to 3 and FIGS. 9 to 13 in combination. FIG. 12 is a schematic diagram of a top view structure of the edge wrapping adhesive tape attached to the first surface of the display device provided by an embodiment of the present disclosure, FIG. 13 is a schematic top view of the structure of the edge wrapping adhesive tape attached to the second surface of the display device provided by an embodiment of the present disclosure. The length L2 of each of the second notches 31 needs to satisfy that after the third tape part 30 is attached to the second surface 301 of the display device 1000, the adjacent third tape parts 30 do not overlap, to prevent the second surface 301 of the display device 1000 from increasing a thickness of the display device 1000 due to stacking of the third tape part 30. The length L1 of the first notch 11 needs to satisfy that after the first tape part 10 is attached to the first surface 201 of the display device 1000, there is no gap between the adjacent first tape parts 10, to prevent light leakage due to a gap on the edge of the first surface 201 of the display device 1000. For example, the adjacent first tape parts 10 just touch or partially overlap or completely overlap the corners of the corresponding display device 1000. When the corners of the display device 1000 are right angles, the adjacent first tape parts 10 completely overlap the corresponding corners of the display device 1000.

Moreover, the first tape part 10 is attached to the edge of the first surface 201 of the display device 1000 and is corresponding to an area where the upper polarizer 24 is not provided. A thickness of the upper polarizer 24 is greater than the thickness of the edge wrapping adhesive tape 100. For example, the thickness of the upper polarizer 24 is usually greater than 0.1 mm, and the thickness of the edge wrapping adhesive tape 100 is 0.05 mm. In this way, even if the adjacent first tape parts 10 are completely overlapped at the corresponding corners of the display device 1000, the thickness of the edge wrapping adhesive tape 100 will not exceed the thickness of the upper polarizer 24. Therefore, the adjacent first tape parts 10 completely overlap at the corresponding corners of the display device 1000. This avoids light leakage at the edge of the first surface 201 of the display device 1000 and does not increase an overall thickness of the display device 1000.

In addition, since the edge wrapping adhesive tape 100 is integrally formed, after the second tape part 20 is attached to the side surface of the display device 1000, there is no overlap on the side surface of the display device 1000. Namely, there is no stack of the edge wrapping adhesive tape 100 on the side of the display device 1000, which prevents interference with the corners of a whole machine, and makes an outer dimension more stable.

Figure 14:
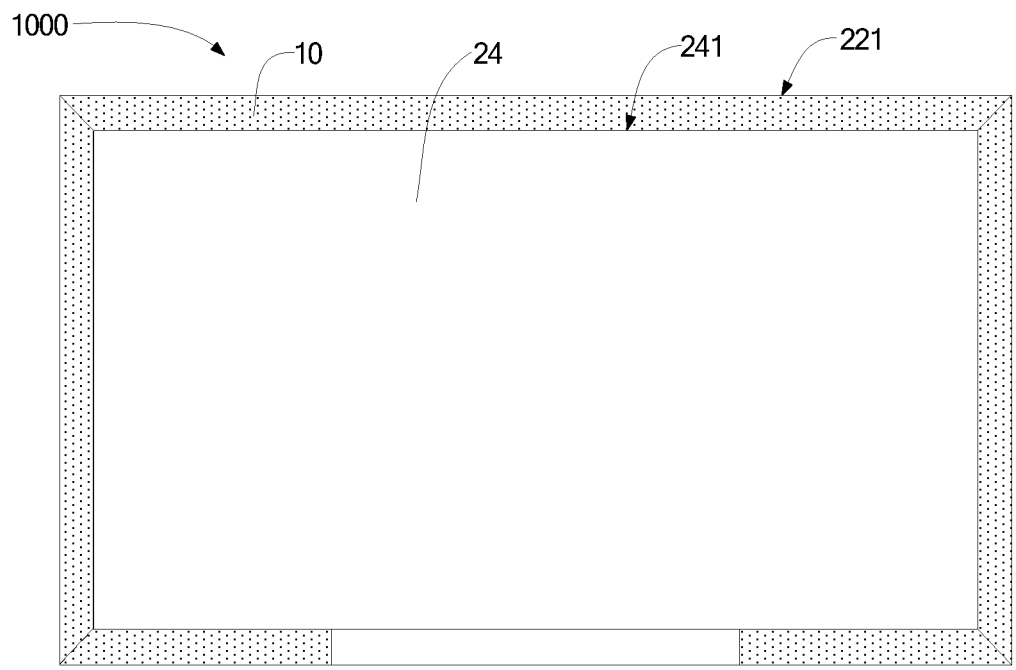
FIG. 14 is a schematic diagram of another top view structure of the edge wrapping adhesive tape attached to a first surface of the display device provided by an embodiment of the present disclosure.

In an embodiment, please refer to FIGS. 4 to 6 and FIG. 14 in combination. FIG. 14 is a schematic diagram of another top view structure of the edge wrapping adhesive tape attached to a first surface of the display device provided by an embodiment of the present disclosure. A difference from the above-mentioned embodiment is that in this embodiment, each of the first notches 11' includes a first sub-notch, the first sub-notch includes a first side 111 and a second side 112, an included angle a is formed between the first side 111 and the second side 112, and the included angle a is formed by a direct intersection of the first side 111 and the second side 112. The included angle a is close to the second notch 31. For example, the first notch 11' is a V-shaped notch. In this way, after the edge wrapping adhesive tape 101 is attached to the display device 1000, the first surface of the display device 1000 does not overlap with the first tape part 10, and there is no light leakage gap.

Specifically, the centerline B-B' of the first notch 11' coincides with the centerline B-B' of the second notch 31, and an end point of the V-shaped notch of the first notch 11' and an end point of the V-shaped notch of the second notch 31 are on a same axis. The length L2 of the second notch 31 is greater than the length L1 of the first notch 11, and the length L1 of the first notch 11' depends on a corner size of the display device 1000. When the first notch 11' is a V-shaped notch, the length L1 of the first notch 11' can also be characterized by an opening angle of the V-shaped notch, then the opening angle of the first notch 11' also depends on the corner size of the display device 1000, and the opening angle of the first notch 11' is also the included angle a of the first notch 11', and the range of the included angle a includes 90 degrees to 120 degrees.

It should be noted that when the corner of the display device 1000 is a right angle, the first notch 11' may be a V-shaped notch. The fact that the corners of the present disclosure are right angles are not limited to the corners of 90 degrees, and the corner here is a right angle only to represent the angle formed by a direct intersection of adjacent sides of the display device 1000. The angle formed by the direct intersection of adjacent side surfaces of the display device 1000 includes but is not limited to an angle of 90 degrees, and may also be an angle greater than 90 degrees or an angle less than 90 degrees. When the corner of the display device 1000 is a 90-degree angle, the opening angle of the V-shaped notch of the first notch 11' is equal to or smaller than the angle when the corner of the display device 1000 is a right angle.

Additionally, in one embodiment, the first notch 11' can also be as shown in FIG. 6, the first side 111 and the second side 112 of the first notch 11' do not directly intersect, and the first side 111 and the second side 112 are connected by a bottom side 113 of the first notch 11'. An extension line of the first side 111 and an extension line of the second side 112 intersect to form an included angle b, and the included angle b is closer to the second notch 31. At this time, a shape of the first notch 11' is approximately a V-shaped notch, and the approximate V-shaped notch can achieve an effect of the above-mentioned V-shaped notch, and is also suitable for display devices with non-right-angle corners. For other descriptions, please refer to the above-mentioned embodiment, which will not be repeated here.

Figure 15:
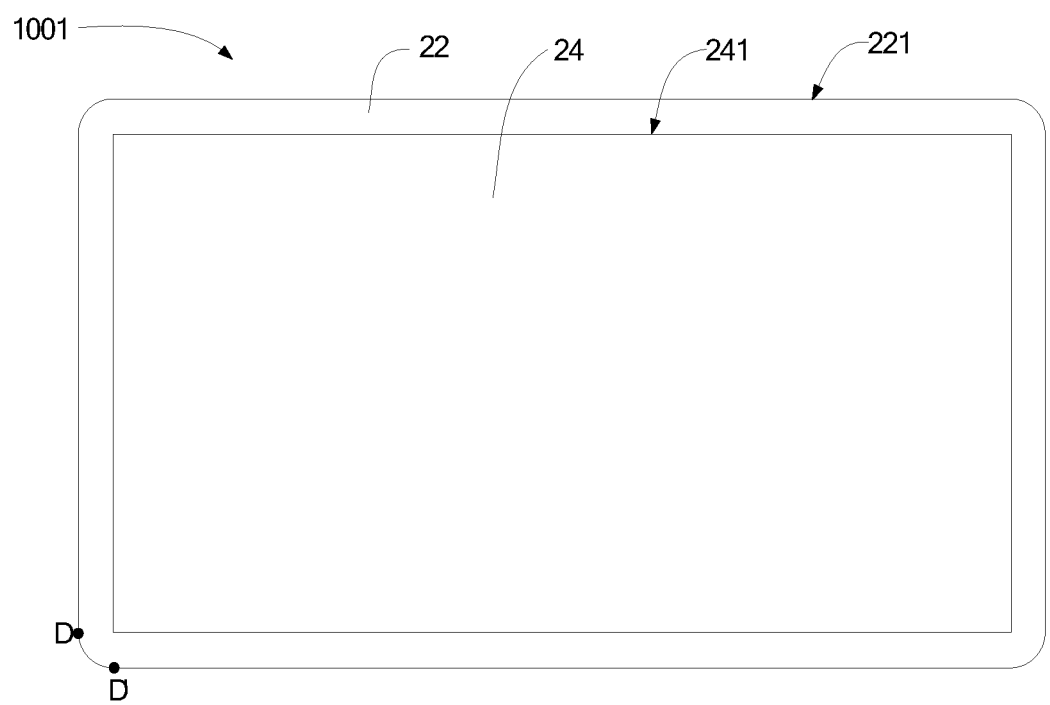
FIG. 15 is a schematic diagram of another top view structure of a display device provided by an embodiment of the present disclosure.

In one embodiment, please refer to FIG. 7 and FIG. 15, FIG. 15 is a schematic diagram of another top view structure of a display device provided by an embodiment of the present disclosure. The difference from the above-mentioned embodiment is that the corners of the display device 1001 are rounded corners. Namely, a transitional arc surface is formed between two adjacent side surfaces of the display device 1001. The arc surface is composed of a plurality of arcs D-D', and a corner corresponding to each arc D-D' is a rounded corner. At this time, the first notch 11" includes a first sub notch 12 and a second sub notch 13, and the first sub notch 12 includes a first side 111 and a second side 112. An included angle a is formed between the first side 111 and the second side 112, and the included angle a is close to the second notch 31. Optionally, the included angle a ranges from 90 degrees to 120 degrees, and a length of the first side 111 is equal to a length of the second side 112. The second sub-notch 13 and the first sub-notch 12 are symmetrical about the centerline B-B' of the first notch 11".

Specifically, the first sub-notch 12 and the second sub-notch 13 are intersected, and an intersection of the first sub-notch 12 and the second sub-notch 13 is far away from the second notch 31. At this time, the first notch 11" is a W-shaped notch as a whole. Correspondingly, the second notch 31 is a V-shaped notch or a similar V-shaped notch.

Specifically, the centerline B-B' of the first notch 11" is collinear with the centerline B-B' of the second notch 31, and the centerline B-B' of the first notch 11" is also collinear with the center axis of the corner of the display device 1001, namely, the centerline B-B' of the first notch 11" coincides with a center axis of the arc surface, and the central axis of a rounded surface is also a straight line formed by midpoints of the a plurality of arcs D-D'.

It should be noted that when the corners of the display device 1001 are rounded, the first notch 11" can also be set as a V-shaped notch or a similar V-shaped notch. For example, when the corners of the display device 1001 are smaller rounded corners, the first notch 11" may be a V-shaped notch, a similar V-shaped notch, or a W-shaped notch. When the corners of the display device 1001 are larger rounded corners, the first notch 11" may be a W-shaped notch.

When the first notch 11" is a V-shaped notch, the end points of the V-shaped notch of the first notch 11" and the end points of the V-shaped notch of the second notch 31 are on a same axis, and after the edge wrapping adhesive tape 102 is attached to the display device 1001, the end points of the V-shaped notch of the first notch 11" and the end points of the V-shaped notch of the second notch 31 coincide with the midpoints of the arcs D-D' at the corner of the display device 1001.

When the first notch 11" is a W-shaped notch, the W-shaped notch is formed by combining two V-shaped notches, and an intersection of the two V-shaped notches (namely, a point on the intersection of the two V-shaped notches) and the end points of the V-shaped notch of the second notch 31 are on a same axis. After the edge wrapping adhesive tape 102 is attached to the display device 1001, the end points of the two V-shaped notches of the W-shaped notch of the first notch 11" coincide with endpoints of two ends of the arcs at the corner of the display device 1001. Of course, the W-shaped notch can also be formed by combining two approximately V-shaped notches or a combination of V-shaped notches and approximately V-shaped notches.

For other descriptions, please refer to the above-mentioned embodiment, which will not be repeated here.

Figure 16:
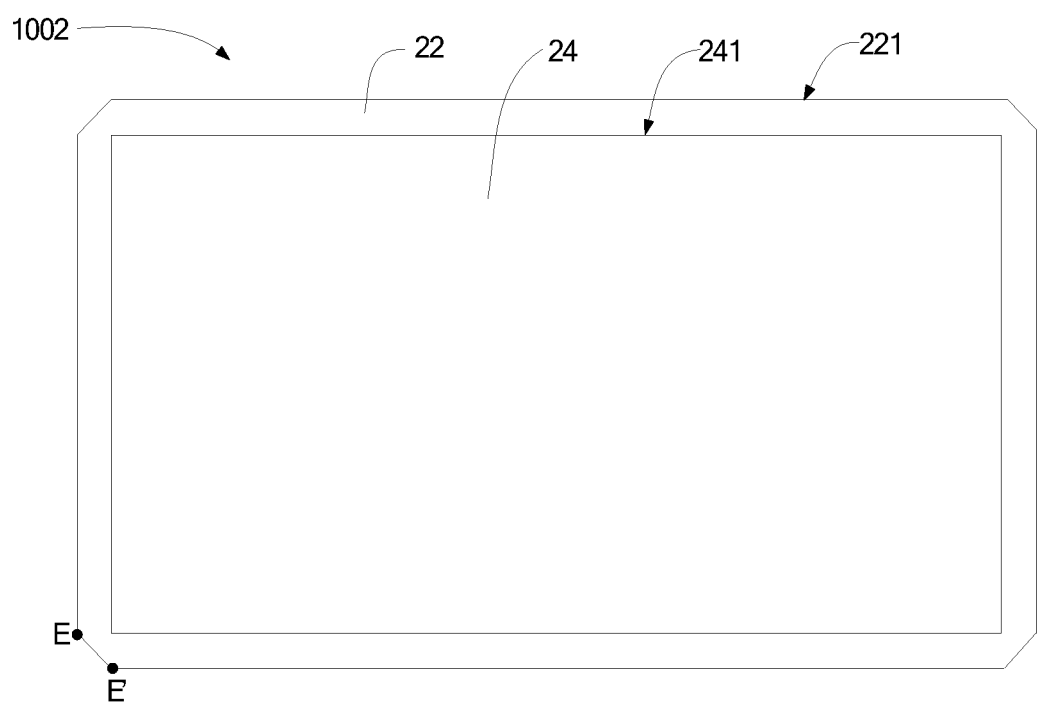
FIG. 16 is a schematic diagram of yet another top view structure of the display device provided by an embodiment of the present disclosure.

In one embodiment, please refer to FIG. 8 and FIG. 16. FIG. 16 is a schematic diagram of yet another top view structure of the display device provided by an embodiment of the present disclosure. The difference from the above embodiment is that the corners of the display device 1002 are chamfered corners, namely, a transition plane is formed between two adjacent sides of the display device 1002. The plane is composed of a plurality of straight lines E-E', and an angle corresponding to each of the straight lines E-E is the chamfer angle. At this time, the first notch 11''' includes a first sub-notch 12 and a second sub-notch 13, and the first sub-notch 12 includes a first side 111 and a second side 112. An included angle a is formed between the first side 111 and the second side 112, and the included angle a is close to the second notch 31. Optionally, a length of the first side 111 is less than a length of the second side 112. The second sub-notch 13 and the first sub-notch 12 are symmetrical about a centerline B-B' of the first notch 11'''.

Specifically, the first sub-notch 12 and the second sub-notch 13 are arranged at intervals, and a distance between the first sub-notch 12 and the second sub-notch 13 is far away from the second notch 31. At this time, the first notch 11''' is a trapezoidal notch as a whole. Correspondingly, the second notch 31 is also a trapezoidal notch. The trapezoidal notch of the present disclosure is similar to the above-mentioned similar V-shaped notch in structures, and a length of a bottom side of the trapezoidal notch is much greater than a length of a bottom side of the similar V-shaped notch. The length of the bottom side refers to a length of the bottom side connecting the first side and the second side.

Specifically, the first sub-notch 12 and the second sub-notch 13 are both similar V-shaped notches, then the first notch 11''' is a trapezoidal notch, which can be roughly regarded as being formed by a combination of two V-shaped notches arranged at intervals. A linear distance between end points of the two V-shaped notches is equal to a distance of each straight line E-E' at the corner of the display device 1002. A trapezoidal notch of the second notch 31 can be approximately regarded as a trapezoidal groove, and a length of a bottom of the trapezoidal groove is equal to the distance of each straight line E-E' at the corner of the display device 1002. After the edge wrapping adhesive tape 103 is attached to the display device 1002, end points of the two V-shaped notch of the trapezoidal notch of the first notch 11''' coincide with end points of each straight line E-E at the corner of the display device 1002 respectively. Two ends of the bottom of the trapezoidal slit of the second notch 31 coincide with the two end points of each straight line E-E' at the corner of the display device 1002, respectively.

In addition, for the case where the corner of the display device 1002 is a chamfered corner, the first notch 11''' can also be designed as a W-shaped notch, which can also achieve an effect of the trapezoidal notch. For other descriptions, please refer to the above-mentioned embodiment, which will not be repeated here.

It should be noted that a number of the first notches and a number of the second notches on the edge wrapping adhesive tape of the present disclosure are equal to a number of the corners of the display device, and the number of the corners of the display device is not limited to four as illustrated in this embodiment. For example, when the display device has a pentagonal shape, and the number of corners of the display device is five, a corresponding number of the first notches is also five. Moreover, shapes of the first notch and the second notch are not limited to those illustrated in the embodiment of the present disclosure. In particular, the shape of the first notch can be configured according to a shape of the corner of the display device, and the shape of the first notch includes, but is not limited to, the broken tangent line, the V-shaped notch, the W-shaped notch, the trapezoidal notch, or various combinations thereof illustrated in the embodiments of the present disclosure.

Figure 17:
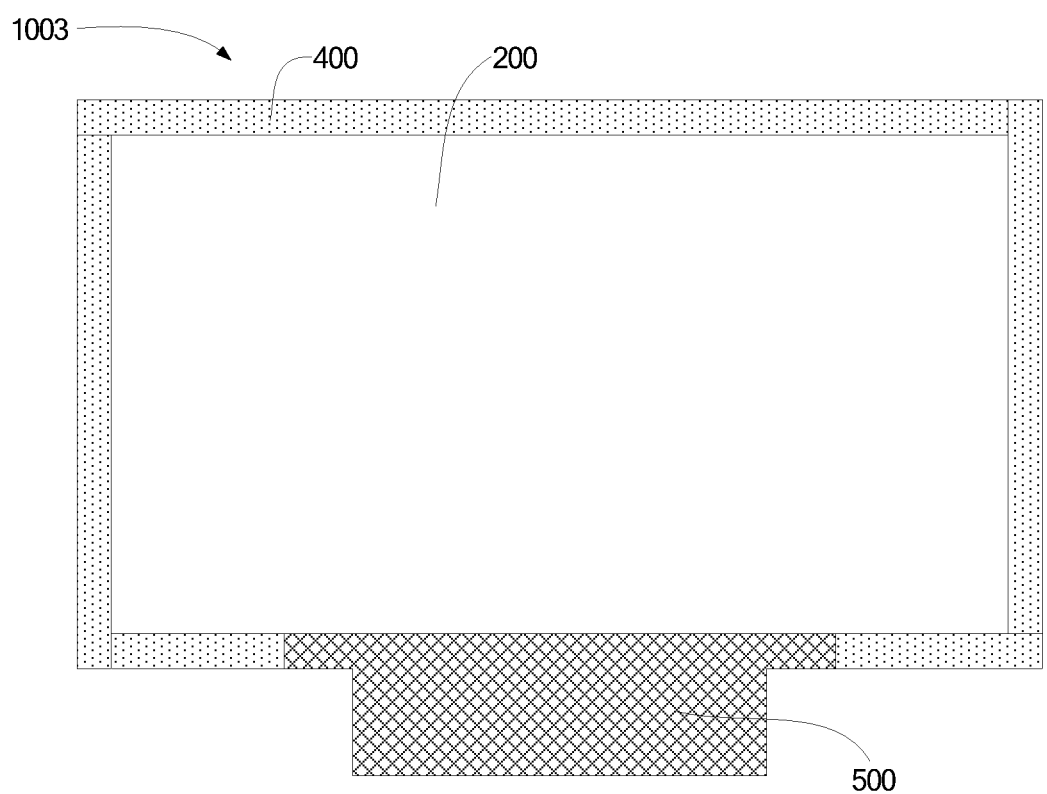
FIG. 17 is a schematic diagram of still yet another top view structure of the display device provided by an embodiment of the present disclosure.

In an embodiment, please refer to FIG. 17. FIG. 17 is a schematic diagram of still yet another top view structure of the display device provided by an embodiment of the present disclosure. The display device 1003 includes a display panel 200, a backlight module (not shown in figure), and a first edge wrapping adhesive tape 400. The backlight module is arranged opposite to the display panel 200 and is configured to provide backlight to the display panel 200. The first edge wrapping adhesive tape 400 is wrapped on a plurality of sides of the display device 1003 to reinforce a combination of the display panel 200 and the backlight module, and to prevent the display device 1003 from leaking light. Wherein the first edge wrapping adhesive tape 400 is formed by the edge wrapping adhesive tape of one of the above embodiments wrapping the display device 1003.

Optionally, the display device 1003 further includes a circuit board (not shown) disposed on one side of the display device 1003, and a second edge wrapping adhesive tape 500 wrapped around the circuit board. Considering complexity of a structure of the circuit board, a material combination of the edge wrapping adhesive tape for attaching the circuit board is also relatively complicated. According to design needs, materials such as conductive double-sided tape, polyethylene terephthalate (PET), foam, and high-temperature tape may be added, and external dimensions are quite different from widths and a structure of another three sides. Therefore, in order to optimize the cost, the second edge wrapping adhesive tape 500 is wrapped on a side corresponding to the circuit board. The first edge wrapping adhesive tape 400 is wrapped on a side of the display device 1003 where the circuit board is not provided. Namely, a side of the display device 1003 provided with the circuit board is wrapped by the first edge wrapping adhesive tape 400 and the second edge wrapping adhesive tape 500, and the first edge wrapping adhesive tape 400 and the second edge wrapping adhesive tape 500 partially overlap to prevent partial light leakage of the display device 1003.

According to the above embodiment, it can be seen that:

In the edge wrapping adhesive tape and the display device provided in the present disclosure, the edge wrapping adhesive tape includes a first tape part, a second tape part, and a third tape part that are integrally disposed, the first tape part defines a plurality of first notches at intervals, the third tape part defines a plurality of second notches opposite to the first notches, and both the first notches and the second notches are corresponding to corners of the display device. For different corners, the first notch can be set as a broken line, a V-shaped notch, a W-shaped notch, a trapezoidal notch, and so on. In this way, after the edge wrapping adhesive tape is wrapped on the display device, no light leakage gaps are left on a side and a first surface of the display device, which solves a problem of light leakage from the corners of the module. Moreover, there is no overlap and stacking of edge wrapping adhesive tape on the side and a second surface of the display device, which avoids interference with the corners of a whole machine. This makes an appearance and a size more stable, and solves a technical problem of poor performance of a traditional edge wrapping adhesive tape of a liquid crystal display module. At the same time, an integrated design of the edge wrapping adhesive tape reduces cost of cutting and manual attachment.

In the above-mentioned embodiments, the description of each embodiment has its own emphasis. For parts that are not described in detail in an embodiment, reference may be made to related descriptions of other embodiments.

The embodiments of the present disclosure are described in detail above, and specific examples are used in this article to illustrate the principles and implementation manners of the present disclosure. The descriptions of the above embodiments are only used to help understand the technical solutions and core ideas of the present disclosure. Those of ordinary skill in the art should understand that: they can still modify the technical solutions described in the foregoing embodiments, or equivalently replace some of the technical features, and these modifications or replacements do not cause the essence of the corresponding technical solutions to deviate from the scope of the technical solutions of the embodiments of the present disclosure.

What is claimed is:

1. An edge wrapping adhesive tape, comprising a first tape part, a second tape part, and a third tape part which are integrally disposed; wherein
   the first tape part defines a plurality of first notches at intervals;
   a plurality of second notches are defined at intervals on a side of the third tape part away from the first tape part, and each of the second notches is arranged opposite to a corresponding first notch; and
   the second tape part is disposed between the first tape part and the third tape part,
   wherein a depth of each of the first notches is equal to a width of the first tape part, and a depth of each of the second notches is equal to a width of the third tape part,
   wherein a centerline of each of the first notches is collinear with a centerline of a corresponding second notch, and
   wherein in a direction along a long side of the edge wrapping adhesive tape, a length of each of the second notches is greater than a length of a corresponding first notch.

2. The edge wrapping adhesive tape of claim 1, wherein a shape of a longitudinal section of each of the first notches is rectangular.

3. The edge wrapping adhesive tape of claim 1, wherein each of the first notches comprises a first sub-notch, the first sub-notch comprises a first side and a second side, an included angle is formed between the first side and the second side, and the included angle is close to a corresponding second notch.

4. The edge wrapping adhesive tape of claim 3, wherein the included angle is defined at the first tape part, and the included angle ranges from 90 degrees to 120 degrees.

5. The edge wrapping adhesive tape of claim 3, wherein the included angle is defined at the second tape part, and the included angle is formed by an intersection of extension lines of the first side and the second side.

6. The edge wrapping adhesive tape of claim 3, wherein each of the first notches further comprises a second sub-notch, and the second sub-notch and the first sub-notch are symmetrical about a centerline of a corresponding first notch.

7. The edge wrapping adhesive tape of claim 6, wherein the first sub-notch and the second sub-notch are intersected, and an intersection of the first sub-notch and the second sub-notch is far away from a corresponding second notch.

8. The edge wrapping adhesive tape of claim 6, wherein the first sub-notch and the second sub-notch are arranged at intervals.

9. A display device, comprising:
a display panel;
a backlight module disposed opposite to the display panel; and
a first edge wrapping adhesive tape wrapped on a plurality of sides of the display device, wherein the first edge wrapping adhesive tape is formed after being wrapped on the display device by the edge wrapping adhesive tape of claim 1.

10. The display device of claim 9, wherein a first tape part of an edge wrapping adhesive tape is wrapped on a first surface of the display device, a second tape part is wrapped on a side surface of the display device, and a third tape part is wrapped on a second surface of the display device.

11. The display device of claim 10, wherein an upper polarizer is attached to a side of the display panel away from the backlight module, an outer contour of the upper polarizer is smaller than an outer contour of the display device, and the first tape part is attached to an area on the display panel where the upper polarizer is not provided.

12. The display device of claim 10, wherein the display device comprises a plurality of corners, and first notches and second notches of the edge wrapping adhesive tape are corresponding to the plurality of corners of the display device.

13. The display device of claim 12, wherein a centerline of each of the first notches is collinear with a center axis of a corresponding corner.

14. The display device of claim 12, wherein each of the first notches comprises a first sub-notch, the first sub-notch comprises a first side and a second side, an included angle is formed between the first side and the second side, and the included angle is close to a corresponding second notch.

15. The display device of claim 14, wherein each of the first notches further comprises a second sub-notch, and the second sub-notch and the first sub-notch are symmetrical about a centerline of a corresponding first notch.

16. The display device of claim 15, wherein the first sub-notch and the second sub-notch are intersected, and an intersection of the first sub-notch and the second sub-notch is far away from a corresponding second notch.

17. The display device of claim 15, wherein the first sub-notch and the second sub-notch are disposed at intervals.

* * * * *